Oct. 4, 1960
L. J. DICKINSON
2,954,690
SNOW FALL INDICATOR
Filed March 12, 1958
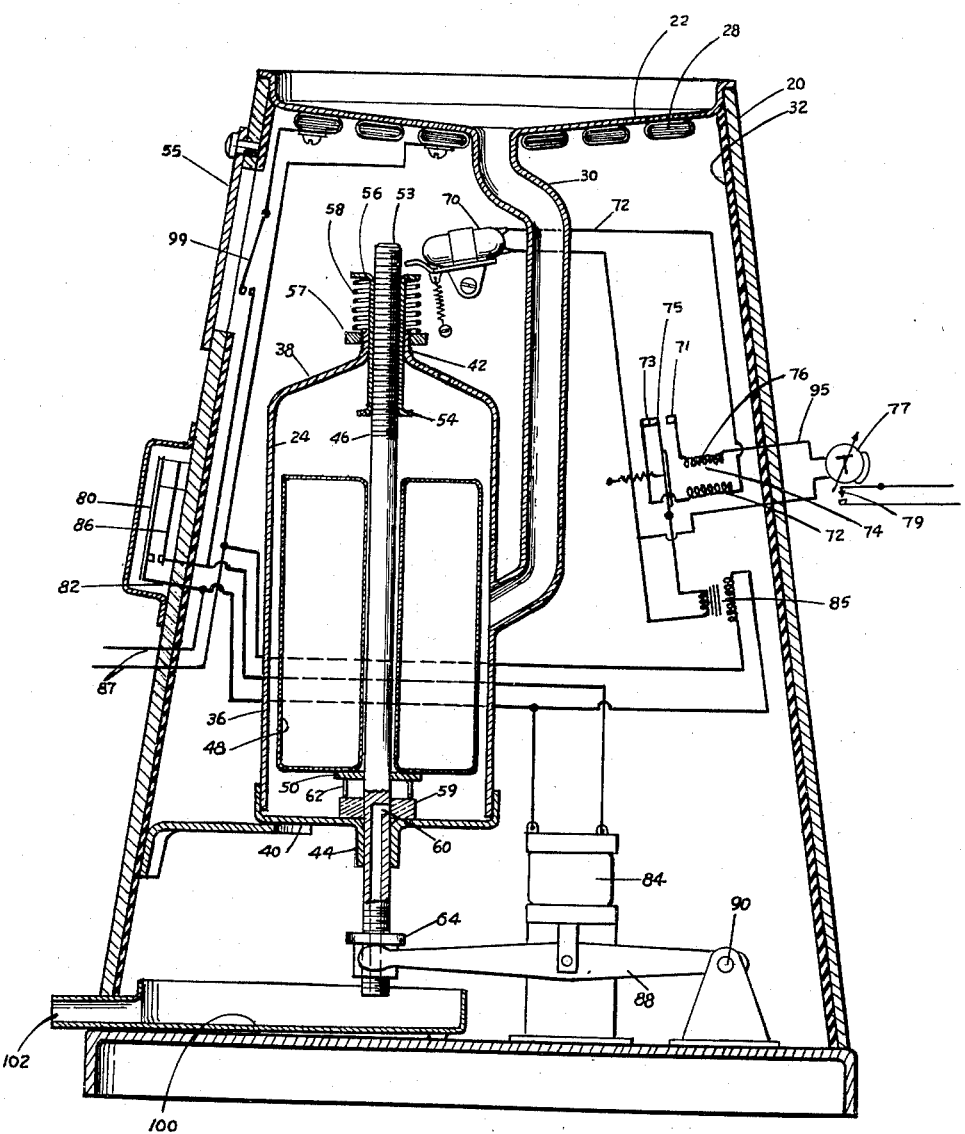
INVENTOR.
LOUIS. J. DICKINSON
BY
ATTORNEY.

United States Patent Office 2,954,690
Patented Oct. 4, 1960

2,954,690
SNOW FALL INDICATOR

Louis J. Dickinson, R.F.D. 2, Palmyra, N.Y.

Filed Mar. 12, 1958, Ser. No. 721,036

2 Claims. (Cl. 73—171)

This invention relates to a snow fall indicator and measuring device, and control circuits associated therewith.

In the snow belt region where snow removal and other services must be brought into operation before any substantial quantity of snow is precipitated, it is desirable to provide a reliable indicator of the rate of snow fall, and to provide an indicator and control circuits which will act in response to the quantity. Since snow may be light or heavy, depending on weather conditions and water content, the amount of snow fall is best determined by reducing the snow to its water equivalent.

The present invention is directed to apparatus adapted to be exposed to snow fall, and adapted to measure or integrate the quantity thereof by reference to its water equivalent. The invention further is directed to a measuring device adapted to provide a signal after predetermined increments of snow, as measured by its water content, has fallen. The invention further is directed to an apparatus in which the increments of snow fall are employed to control increments of heat, as for example, for melting snow upon a driveway or walkway, the increments of heat being correlated to the quantity of snow fall, whereby efficient melting may be effected and heat waste avoided. Further, the invention relates to a self contained portable unit for the measuring apparatus that may be suitably located for exposure to snow fall, and having protective means whereby operation is limited to temperature conditions usually accompanying snow fall.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts, the single figure is a sectional view of the measuring apparatus with the electrical circuits associated therewith shown diagrammatically.

Referring to the drawings, there is shown a portable housing 20, adapted to be located in a position to accurately sample snow fall. The upper end of the housing is provided with a collector generally indicated at 22, which may be round or square as desired. Within the housing is a water measuring device 24, adapted to receive water resulting from snow falling on the collector, and melted thereon.

The collector 22 comprises a relatively large pan disposed horizontally and facing upwardly, and the housing will be so situated as to expose the collector to receive snow thereupon at a rate corresponding to the snow fall rate in the immediate vicinity. Such pan is provided on the underside thereof with an electric heater 28 capable of causing snow striking the pan to promptly melt. The pan is sloped so as to drain into a pipe 30 which leads downwardly to the water measuring device 24. The housing side wall may have a layer of insulation as at 32 so as to maintain a temperature within the housing above freezing, and heat may be derived from the heater 28 for this purpose or otherwise as desired.

The melted snow in the form of water flows into measuring device 24, which comprises a float chamber 36, in the form of a vertical cylinder, capped at the upper and lower ends as at 38 and 40. The caps are provided with central guide sleeves 42 and 44 respectively through which extends a valve rod 46. Disposed about the rod is an annular float 48, which may comprise a hollow annular air chamber, the float being freely slidable on the rod, and vertically movable within the chamber. The float when in the lower position shown, rests upon a collar 50 affixed to the valve rod 46.

The valve rod at its upper end is provided with a sleeve 52, threaded thereon as at 53, and which sleeve is adjustable along the length of the rod by threading the sleeve up or down upon the rod. Such sleeve has a lower flange 54 within the chamber adapted to engage the upper end of the float when the float rises, and an upper flange 56, disposed exteriorly of the chamber and adapted to bear against a coil spring 58, of a resiliency such that the weight of the rod and sleeve are suitably counteracted so as to counterbalance the weight of the rod and sleeve. The lower end of the spring may bear upon a flange nut 57, threaded on the sleeve 42, whereby adjustment of the spring may be had, and the housing may have an access door 55 for this purpose in the side wall thereof.

The lower end of the rod extends through a seal 59 in the lower end of the chamber, and projects below the chamber. The rod is provided with a side port 60, communicating with an axial bore 62, which side port 60, when above the seal 59, acts to drain the chamber, and when located below the seal acts to close off the bottom of the chamber. The weight of the float 48 when the chamber is empty, bears against the collar 50 and is sufficient to move the rod downwardly to the position shown, to seal the valve port 60, within the seal 59, and close off the lower end of the chamber, and the friction of the rod in moving through the seal is sufficient to hold the valve rod down, once so positioned by the weight of the float, until lifted by the buoyancy of the float and its engagement with the lower sleeve flange 54 of the sleeve 52. The collar 50 rests upon stops 62 projecting upward from the seal when in the lower position. The upward movement of the rod is limited by the collar or flange 64 located on the lower end of the rod, it being seen that upward movement of the valve rod is limited by engagement of the flange 64 with the lower end of the cap sleeve 44.

When snow falls upon the plate 22, the water content resulting from melting snow flows down the tube 30, and commences to fill the chamber 24. The float rises, with the water level in the chamber and engages the flange 54. When a sufficient and measured quantity of water has flowed into the chamber to render the float sufficiently buoyant to lift the sleeve 52 and valve rod 46, against the friction thereof in the seal 59, the port 60 is raised above the seal 59, and the chamber commences to drain. Thus each time the chamber receives a predetermined quantity of water, the valve rod 46 is lifted to its upper position, and upon the chamber draining, the float lowers, finally resting on the collar 50, whereupon the valve rod is moved to its lower position.

The float chamber drains into a pan 100 having an outside drain conduit 102 which, if necessary, may be protected from freezing as desired.

The upward movement of the valve rod actuates a pivotally mounted mercury switch 70 connected by a lead 172 to energize a solenoid 72 of a relay 74. The relay is provided with a hold in coil 76, which is in circuit with a clock timer such as 77, which actuates the switch 79 of a control circuit. The relay 74 when energized by the closing of the mercury switch promptly actuates the armature 75 of the relay to open the contact 73 and close the hold in contacts 71. Thus the current flow in the mercury switch is cut off immediately. When the float drops, and the valve rod drops, the mercury switch returns to the open position, to await actuation upon the next rise of the float and valve rod.

In practice, a thermostatic switch set for approximately 34° F. is provided exteriorly of the housing as at 80, so as to open the power circuit 82 supplying heating power to the electric heater 28, whenever the outside temperature is 34° F. or above, for any heat applied to the pan 22 under such conditions would likely be wasted. The relay circuit is energized from a small transformer 85, connected to the power leads 87.

Since at a temperature such as 34° F. or above, rain may fall, which would tend to collect in the pan 22, and actuate the measuring device 24, a low current solenoid 84 is connected across the contacts 86 of the thermostat 80 so that when such contacts are open, the solenoid will be energized by the line voltage. Such solenoid actuates a lever 88 pivoted as at 90, which lever bears against the underside of the collar 64 and lifts the valve rod 46 to the open position, overcoming the weight of the float 48. Thus rain water will drain from the chamber at all times, when the outside temperature exceeds the setting of the thermostat 80, and the apparatus is thus rendered automatically sensitive to water melted from snow, as may be precipitated during temperature conditions below that for which the thermostat 80 is set, as for example, 34°.

The clock timer, which may be of any suitable type, as is well known in the art, is adapted to hold the circuit 95 closed for any selectable period, which will normally be shorter than the time required for the float mechanism to operate through a cycle, during a maximum rate of snowfall. Such timer during each increment of operation may close a switch 79 for the duration of each increment, and the circuit thus closed may be connected directly, or through suitable relays, to a driveway heater, or a warning signal or the like. The length of such increment during which the switch 79 is closed will supply the approximate amount of heat to a driveway as would normally be necessary to melt the quantity of snow fallen during the time interval of a cycle of operation of the water measuring device 24. Thus the heat used will be correlated to the amount of snow fall as determined by its water content, over a period of time.

By interposing a switch 99 in the heater circuit, the apparatus may be employed as a rain gage, or a gage for measuring irrigation water fall. It will be seen that by opening the switch 99, the thermostat 80 will be rendered ineffective, as well as the solenoid 84, so that the valve rod will be free to cycle as the float rises and falls in response to water fall from rain, or irrigation. Also, the heater will be de-energized. When used to measure water sprayed for irrigation purposes, the circuit 95 may be connected to an electro operated valve, to close the same. Such valve when closed will open the circuit, as will be readily understood in the art.

The power leads 87, and signal circuit leads 95 may be as long as desired so that the apparatus may be so placed as to be capable of accurately sampling snow fall, and the apparatus being portable may be located so as to be shielded from wind conditions and the like. There will always be sufficient heat applied to the pan 22 so that melting will take place almost immediately so that mere contact of snow therewith will fully convert the snow to water.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A snow fall measuring device, comprising an exposed catch pan, means for heating the pan to convert snow falling on the pan to water, temperature sensitive means for rendering said heating means inoperative at temperatures above freezing, a float chamber connected to said pan to receive the water formed thereon, a float in said chamber, a drain valve in the lower end of said chamber, means actuated by the float for opening and closing said valve upon the rise and fall of said float, and means responsive to said temperature sensitive means and operatively connected to said valve for opening, and holding open said valve at temperatures above freezing.

2. A snow fall measuring device, comprising an exposed catch pan, means for heating the pan to convert snow falling on the pan to water, a float chamber connected to said pan to receive the water formed thereon, means for rendering said heating means effective at freezing temperatures or less, a float in said chamber, a drain valve in the lower end of said chamber, means actuated by the float for opening and closing said valve upon the rise and fall of said float, a signal circuit, means to energize said circuit for each actuation of said valve to the open position, and means to hold said drain valve open at temperatures above freezing operatively connected to said second named means.

References Cited in the file of this patent

UNITED STATES PATENTS

| | | |
|---|---|---|
| 423,879 | Page | Mar. 18, 1890 |
| 2,118,459 | Choppell et al. | May 24, 1938 |
| 2,789,431 | Wong | Apr. 23, 1957 |

FOREIGN PATENTS

| | | |
|---|---|---|
| 8,214 | Great Britain | Apr. 22, 1901 |